US008487239B2

(12) United States Patent
Howes et al.

(10) Patent No.: US 8,487,239 B2
(45) Date of Patent: Jul. 16, 2013

(54) MASS SPECTROMETER

(75) Inventors: Kevin R. Howes, Altrincham (GB); Eliot Powell, Staffordshire (GB); Paul Read, Lancashire (GB)

(73) Assignee: Micromass UK Limited, Manchester (GB)

( * ) Notice: Subject to any disclaimer, the term of this patent is extended or adjusted under 35 U.S.C. 154(b) by 494 days.

(21) Appl. No.: 12/474,530

(22) Filed: May 29, 2009

(65) Prior Publication Data

US 2010/0301200 A1 Dec. 2, 2010

(51) Int. Cl.
*B01D 59/44* (2006.01)

(52) U.S. Cl.
USPC .................. 250/282; 250/423 R; 250/492.21

(58) Field of Classification Search
USPC ........................................................ 250/282
See application file for complete search history.

(56) References Cited

U.S. PATENT DOCUMENTS

| | | | | |
|---|---|---|---|---|
| 3,418,513 | A * | 12/1968 | Elliott | 313/230 |
| 4,076,993 | A * | 2/1978 | Nowak | 313/360.1 |
| 6,670,623 | B2 * | 12/2003 | Vella | 250/492.21 |
| 6,809,312 | B1 * | 10/2004 | Park et al. | 250/281 |
| 7,723,700 | B2 * | 5/2010 | Horsky et al. | 250/429 |
| 8,188,448 | B2 * | 5/2012 | Benveniste et al. | 250/492.21 |
| 2004/0000647 | A1 * | 1/2004 | Horsky | 250/427 |

* cited by examiner

*Primary Examiner* — Phillip A Johnston
(74) *Attorney, Agent, or Firm* — Waters Technologies Corp

(57) ABSTRACT

An ion source, a mass spectrometer and a method of enhancing the performance of an ion source for use with a mass spectrometer. The ion source has a housing incorporating an ion source enclosure defining a chamber and an outer cover remote from the chamber. A fluid flow passageway is provided between the ion source enclosure and the outer cover. The method of the invention comprising supplying to the ion source housing a regulated flow of fluid through the fluid passageways so as to maintain the ion source enclosure within a predetermined temperature range of substantially between 60° c. and 80° c. and preferably at 70° c.

12 Claims, 4 Drawing Sheets

MASS SPECTROMETER

The present invention relates to the field of mass spectrometry.

BACKGROUND ART

Ion sources are an important part of the mass spectrometer. Mass spectrometers can only produce results of what is input into the instrument. If the ion source is very inefficient, which means that very few sample ions are produced, the mass spectrometer will also be inefficient. Equally, if the ion source produces too many ions from solvent or other impurities in the instrument noise produced within the instrument may reduce the potential performance.

Ion sources produce greater numbers of sample ions at higher temperatures. However, they will also produce more noise ions at higher temperatures too. These high temperatures also result in the access to source enclosures needing to be restricted for compliance with regulatory requirements. To date, this has been achieved by the use of additional instrument panels.

It would therefore be desirable to produce an ion source that can be regulated to be at the optimum temperature within the ion source, but for the external face of the source to be at room or at least at a safe temperature to touch.

SUMMARY OF THE INVENTION

One aspect of the present invention provides a method of enhancing the performance of an ion source for use with a mass spectrometer which ion source has a housing incorporating an ion source enclosure defining a chamber and an outer cover remote from the chamber and wherein a fluid flow passageway is provided between the ion source enclosure and the outer cover, the method comprising supplying to the ion source housing a regulated flow of fluid through the fluid passageways so as to maintain the ion source enclosure within a predetermined temperature range of substantially between 60° c. and 80° c. Preferably, the predetermined temperature range is approximately 70° c.

Another aspect of the present invention provides an ion source housing for use with a mass spectrometer which housing incorporates an ion source enclosure defining a chamber and an outer cover remote from the chamber and wherein a fluid flow passageway is provided between the ion source enclosure and the outer cover which passageway has an inlet and at least one outlet positioned so as to encourage an efficient flow of fluid through said fluid flow passageway in order to maintain the ion source enclosure within a predetermined temperature range of substantially between 60 c and 80 c. Preferably, the fluid flow passageway incorporates a heat sink.

Yet another aspect of the present invention provides a mass spectrometer having an ion source enclosure according to the immediately preceding paragraph wherein the ion source has mounting means complementary to mounting means provided by the mass spectrometer to detachably couple the ion source with said mass spectrometer and to allow movement of the housing to bring the ion source chamber into position of use at the inlet of said mass spectrometer and to take the ion source chamber from said position of use into a retracted position, and a release mechanism that cooperates with said mass spectrometer to allow said movement of said housing. Preferably, the ion source mounting and the complementary mass spectrometer mounting together allow pivotal movement of the ion source housing towards and away from the inlet of said mass spectrometer. Preferably, the ion source mounting and the complementary mass spectrometer mounting together allow translatory movement of the ion source housing when in the retracted position in a direction along the axis of said pivotal movement to allow detachment and replacement of the ion source housing with respect to said inlet of the mass spectrometer.

According to a further feature of this aspect of the invention, pressure sensor means may be provided to allow continuous monitoring of source pressure and periodic leak checking of the source enclosure and wherein the pressure sensor means may be adapted to actuate a pressure check valve to prevent potentially dangerous source over-pressurization occurring in fault conditions. Preferably, the pressure sensor means is operatively connected to an atmospheric pressure ionization (API) solenoid which is adapted to close at a predetermined pressure to protect the pressure sensor means. It also is preferred that an exhaust isolation valve is provided and operative in the event that API gas is not present to prevent migration of external gases into the ion source.

According to yet another feature of this aspect of the invention, sealing means may be provided to create an air tight seal between said housing and said mass spectrometer when the ion source chamber is in said position of use.

BRIEF DESCRIPTION OF THE DRAWINGS

Various embodiments of the present invention will now be described, by way of example only, and with reference to the accompanying drawings in which.

DETAILED DESCRIPTION OF THE PREFERRED EMBODIMENT

Figure 1:
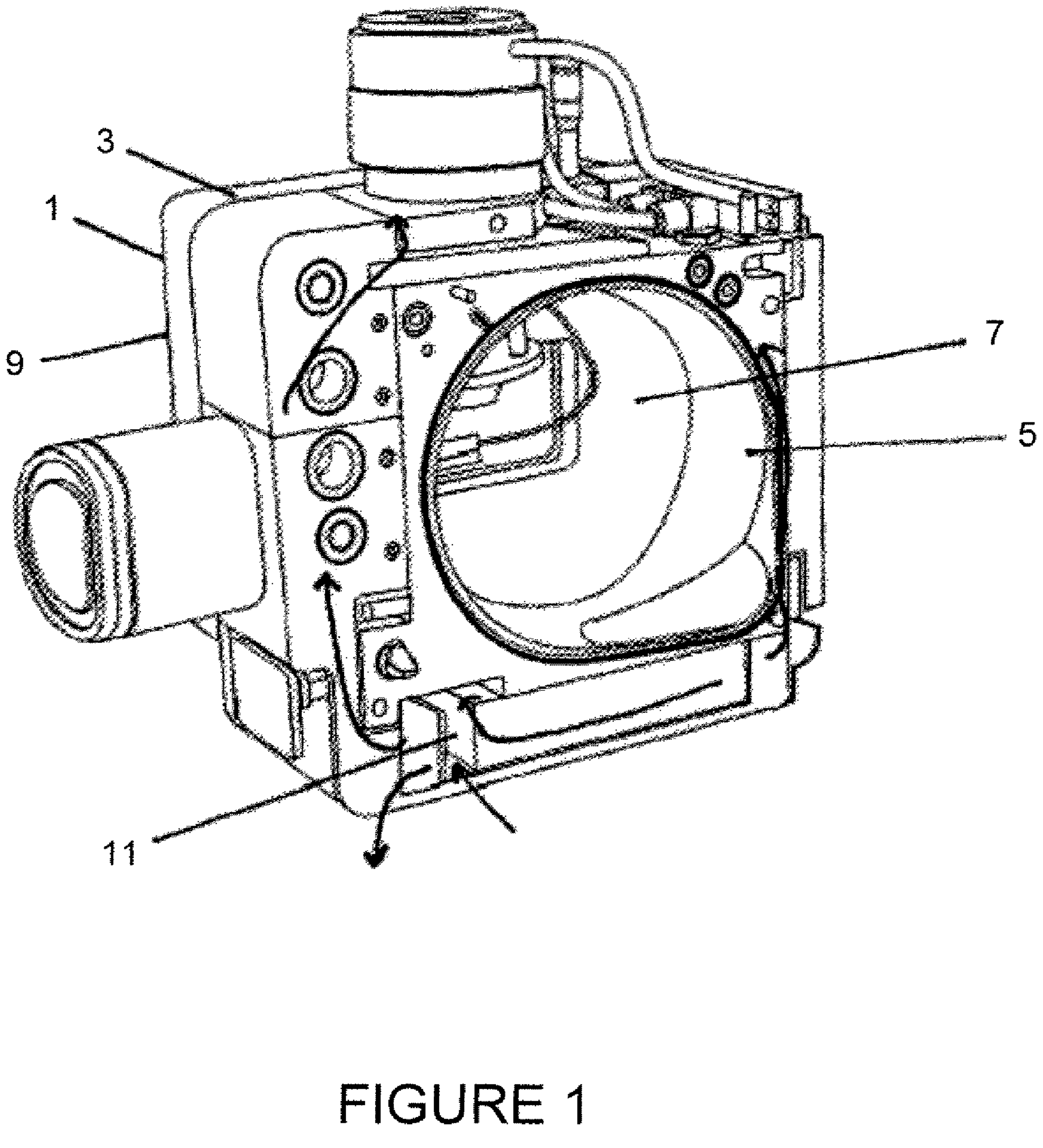
FIG. 1 is a diagram of an ion source from the side attached to the mass spectrometer.

FIG. 1 shows an ion source (1) in accordance with the invention. The ion source has a housing(3), an ion source enclosure (5) which defines an ion chamber (7) and an outer cover (9) remote from the chamber. A fluid flow passageway (11) is provided between the ion source enclosure (5) and the outer cover (9).

Figure 2:
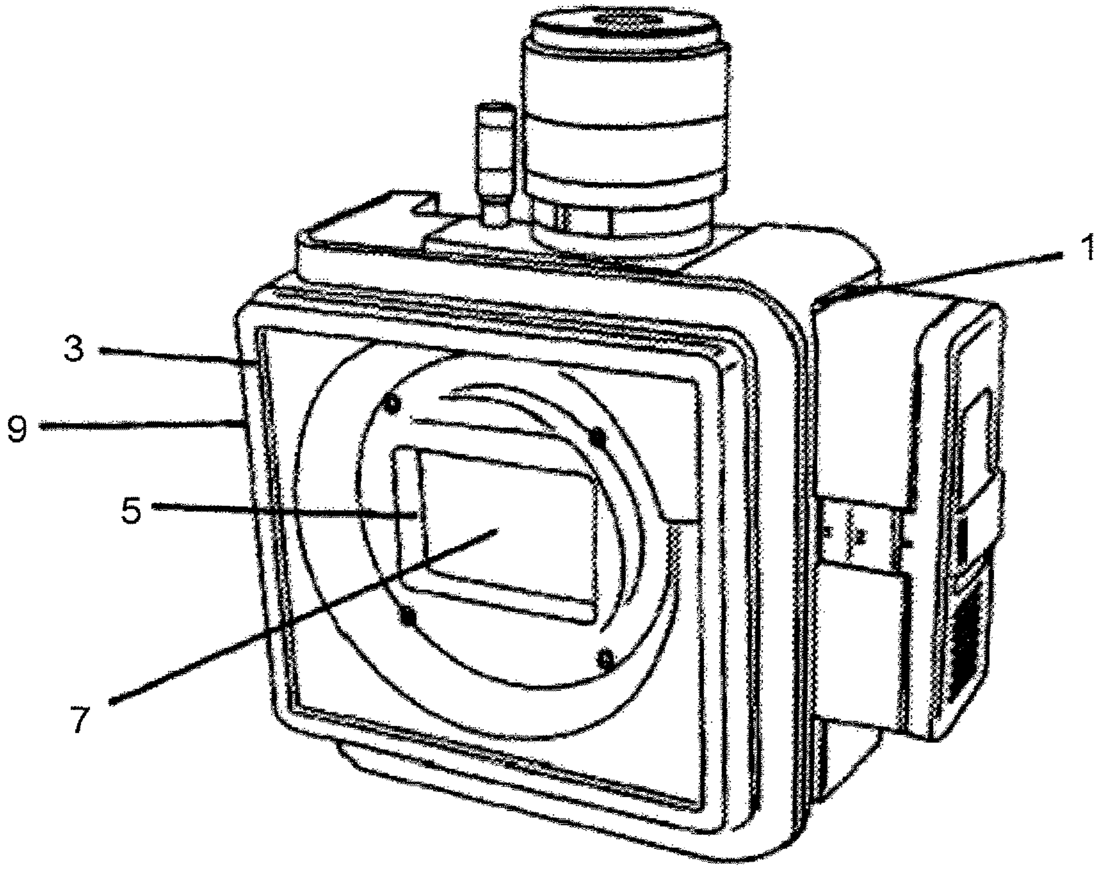
FIG. 2 is a diagram of the ion source from the external side when attached to the mass spectrometer.

FIG. 2 shows an alternative ion source (1) in accordance with the invention. The ion source has a housing(3), an ion source enclosure (5) which defines an ion chamber (7) and an outer cover (9) remote from the chamber. A fluid flow passageway (not visible) is provided between the ion source enclosure (5) and the outer cover (9).

Figure 3:
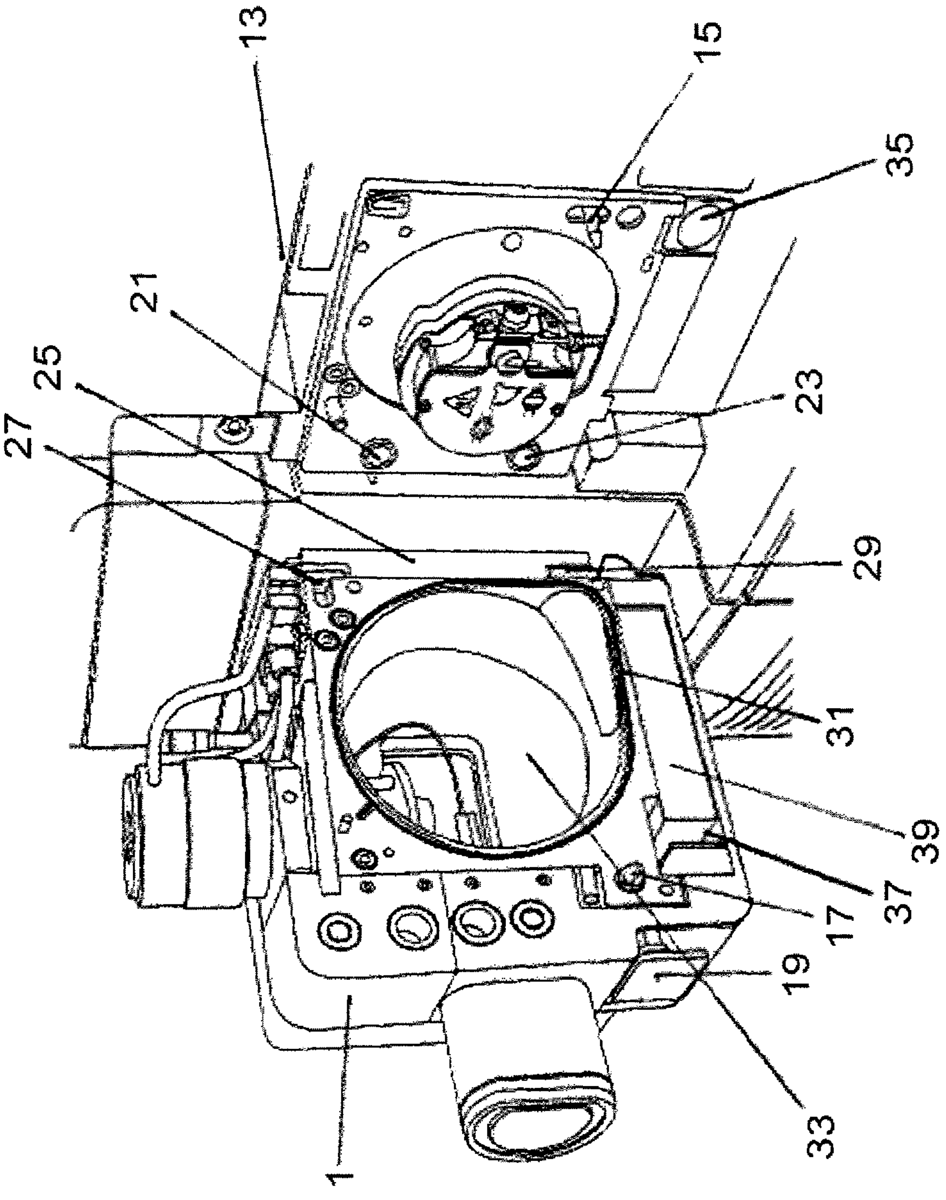
FIG. 3 is a diagram of a source in accordance with the current invention.

FIG. 3 is a diagram of a source in accordance with the present invention. The ion source (1) is hinged away from, but proximal to the mass spectrometer (13). The source detachably latches on to the mass spectrometer by latch mechanism (15) on the mass spectrometer and release mechanism (17) upon the ion source housing. The release handle (19) actuates release mechanism (17) so as to release the ion source (1) from the mass spectrometer (13) when in a closed position of use so that it can be hinged into a retracted position as shown.

The source may be mounted on the mass spectrometer by way of mounting points (21 and 23) and corresponding mounting cavities (not shown) upon the source at a mounting plate (25). The mounting plate is hingably attached to the main source body by a plurality of hinges (27 and 29). A seal (31) seals the ion source to the mass spectrometer so that the source enclosure (33) is sealed in an air tight manner. The figure also shows outlet port (35) from which air is pumped from the mass spectrometer into the cavity (37) of the ion source (1). Heat sink (39) is arranged within the air path to cool the air passing through.

Figure 4:
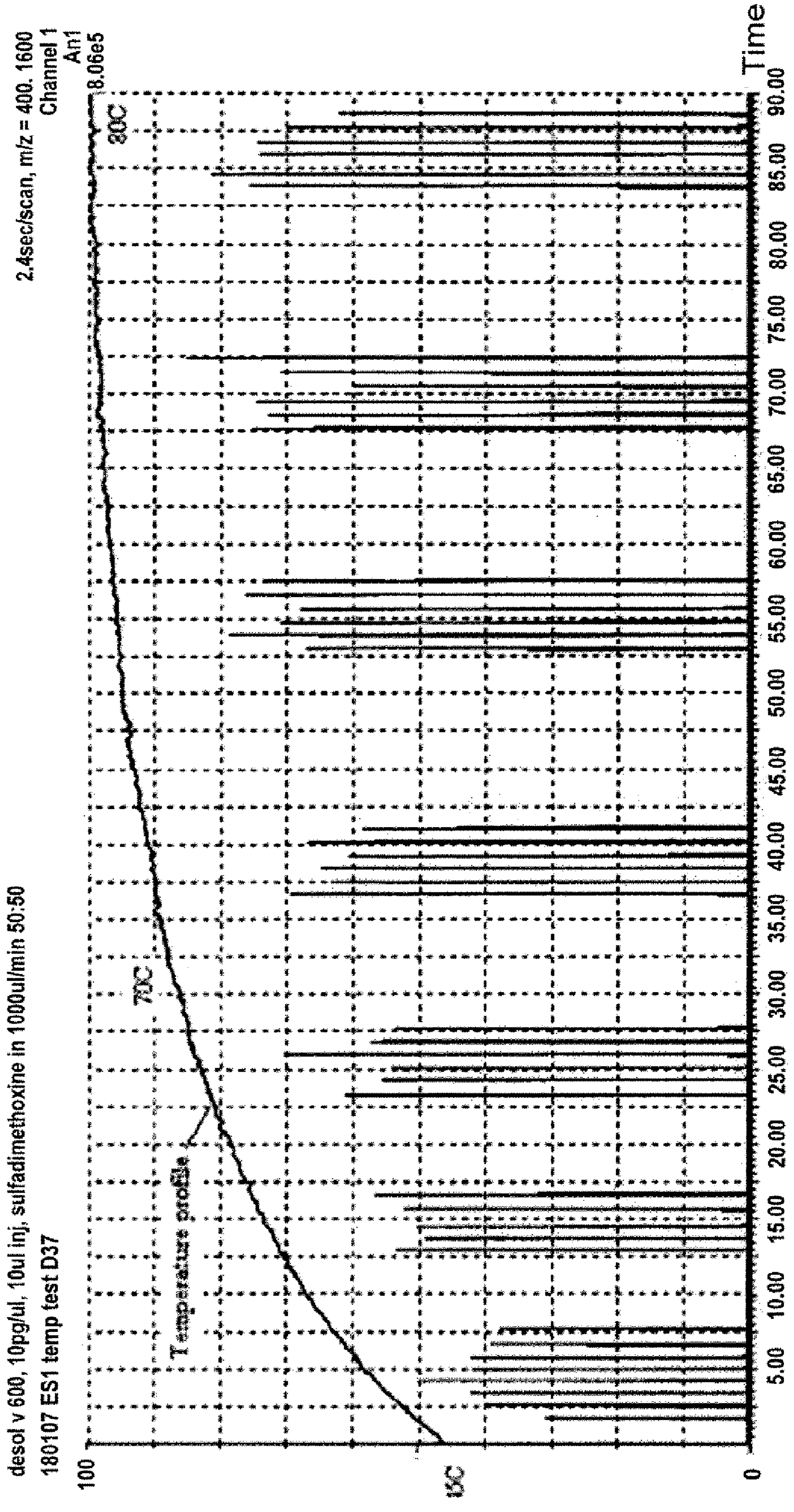
FIG. 4 is a graph illustrating the performance of the ion source against temperature.

Table 1 and FIG. 4 are results from an experimental test of the performance of the ion source over a range of temperatures.

TABLE 1

| | Peak area stats | | | | S/N (PtP) stats | | |
|---|---|---|---|---|---|---|---|
| Temp | PtP (noise) | Mean | Std dev | % Std dev | Mean | Std dev | % Std dev |
| 46.26 | 554 | 7858 | 378.06 | 4.81 | 1855.3 | 306.91 | 16.54 |
| 58.836 | 601 | 10900 | 233.94 | 2.14 | 1798.7 | 97.8 | 5.43 |
| 67.516 | 714 | 12216 | 374.7 | 3.06 | 1704.1 | 183.39 | 10.76 |
| 72.8 | 756 | 15006 | 633.15 | 4.21 | 1628.8 | 120.84 | 7.41 |
| 76.99 | 807 | 16586 | 597.22 | 3.6 | 2043.5 | 195.88 | 9.58 |
| 78.997 | 838 | 16920 | 887.21 | 5.24 | 2206.6 | 194.85 | 8.83 |
| 80.29 | 906 | 17413 | 763.98 | 4.38 | 2320.8 | 97.85 | 4.21 |

As can be seen from the table and the graph in FIG. 4, the effects of increasing the source enclosure temperature on spectral responses, with heating to ~75° C. approximately doubles the signal responses. Moreover, the S/N(PtP) values for the same temperature change are seen to increase.

Other Embodiments

It will be apparent that various modifications may be made to the particular embodiments discussed above without departing from the scope of the invention.

The invention claimed is:

1. A method of enhancing the safety and performance of an ion source for use with a mass spectrometer which ion source has a housing incorporating an ion source enclosure defining a chamber and an outer cover remote from and surrounding the chamber and wherein a fluid flow passageway is provided in the housing around the ion source enclosure and between the ion source enclosure and the outer cover, the method comprising supplying to the fluid passageway a regulated flow of fluid through the fluid passageway for circulation around the ion source enclosure and between the ion source enclosure and the outer cover so as to maintain the ion source enclosure within a predetermined temperature range of substantially between 60° C. and 80° C. and to maintain the outer cover at a temperature that is safe for a user to touch.

2. A method of enhancing the safety and performance of an ion source as claimed in claim 1 wherein said predetermined temperature range is approximately 70° C.

3. An ion source housing for use with a mass spectrometer which housing incorporates an ion source enclosure defining a chamber and an outer cover remote from and surrounding the chamber and wherein a fluid flow passageway is provided in the housing around the ion source enclosure and between the ion source enclosure and the outer cover, which passageway has an inlet and at least one outlet positioned so as to encourage an efficient flow of fluid through said fluid flow passageway for circulation around said ion source enclosure and between the ion source enclosure and the outer cover in order to maintain the ion source enclosure within a predetermined temperature range of substantially between 60° C. and 80° C. and to maintain the outer cover at a temperature that is safe for a user to touch.

4. An ion source housing according to claim 3 wherein said fluid flow passageway incorporates a heat sink.

5. A mass spectrometer having an ion source housing according to claim 3 wherein the ion source housing has mounting means complementary to mounting means provided by the mass spectrometer to detachably couple the ion source housing with said mass spectrometer and to allow movement of the housing to bring the ion source chamber into position of use at the inlet of said mass spectrometer and to take the ion source chamber from said position of use into a retracted position, and a release mechanism that cooperates with said mass spectrometer to allow said movement of said housing.

6. A mass spectrometer according to claim 5, wherein the ion source mounting and the complementary mass spectrometer mounting together allow pivotal movement of the ion source housing towards and away from the inlet of said mass spectrometer.

7. A mass spectrometer according to claim 6 wherein the ion source mounting and the complementary mass spectrometer mounting together allow translatory movement of the ion source housing when in the retracted position in a direction along the axis of said pivotal movement to allow detachment and replacement of the ion source housing with respect to said inlet of the mass spectrometer.

8. A mass spectrometer according to claim 6 or claim 7, wherein pressure sensor means is provided to allow continuous monitoring of source pressure and periodic leak checking of the source enclosure and wherein the pressure sensor means is adapted to actuate a pressure check valve to prevent potentially dangerous source over-pressurization occurring in fault conditions.

9. A mass spectrometer as claimed in claim 8, wherein said pressure sensor means is operatively connected to an atmospheric pressure ionization (API) solenoid which is adapted to close at a predetermined pressure to protect the pressure sensor means.

10. A mass spectrometer as claimed in claim 9, wherein an exhaust isolation valve is provided and operative in the event that API gas is not present to prevent migration of external gases into the ion source.

11. A mass spectrometer according to claim 5, wherein sealing means is provided to create an air tight seal between said housing and said mass spectrometer when the ion source chamber is in said position of use.

12. An ion source housing for use with a mass spectrometer, said housing having an open side and incorporating:

an ion source enclosure at said open side and defining an open-sided chamber;

an outer cover remote from and surrounding said open-sided chamber, a fluid flow passageway in the housing around the ion source enclosure and between the ion source enclosure and the outer cover, which passageway has an inlet and at least one outlet positioned so as to encourage an efficient flow of fluid through said fluid flow passageway for circulation around said ion source enclosure and between the ion source enclosure and the outer cover in order to maintain said ion source enclosure within a predetermined temperature range of substantially between 60° C. and 80° C. and to maintain the outer cover at a temperature that is safe for a user to touch, and an ion source mounting configured to cooperate with a mounting of said mass spectrometer in order to allow movement of said housing to bring said open side of said chamber into a position of use at an inlet of said mass spectrometer and to take said housing from said position of use into a retracted position, wherein said fluid passageway inlet is positioned on said open side of said housing for receiving a flow of fluid from an outlet of said mass spectrometer when said housing is in said position of use.

* * * * *